United States Patent
Kayran et al.

(10) Patent No.: US 12,427,848 B2
(45) Date of Patent: Sep. 30, 2025

(54) HYBRID-ELECTRIC POWERTRAIN AND LORRY EQUIPPED WITH SAME

(71) Applicant: Daimler Truck AG, Leinfelden-Echterdingen (DE)

(72) Inventors: Guenter Kayran, Ostfildern (DE); Jens Luckmann, Winnenden (DE); Detlef Schnitzer, Denkendorf (DE); Frank Steffens, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 326 days.

(21) Appl. No.: 17/797,879

(22) PCT Filed: Feb. 2, 2021

(86) PCT No.: PCT/EP2021/052401
§ 371 (c)(1),
(2) Date: Aug. 5, 2022

(87) PCT Pub. No.: WO2021/156236
PCT Pub. Date: Aug. 12, 2021

(65) Prior Publication Data
US 2023/0059031 A1    Feb. 23, 2023

(30) Foreign Application Priority Data
Feb. 7, 2020    (DE) .................. 10 2020 000 798.8

(51) Int. Cl.
*B60K 6/405* (2007.10)
*B60K 6/365* (2007.10)
(Continued)

(52) U.S. Cl.
CPC .............. *B60K 6/405* (2013.01); *B60K 6/365* (2013.01); *B60K 6/48* (2013.01); *B60L 7/10* (2013.01);
(Continued)

(58) Field of Classification Search
CPC .......... B60K 6/405; B60K 6/365; B60K 6/48; B60K 2006/4825; B60K 6/40; B60K 6/22;
(Continued)

(56) References Cited

U.S. PATENT DOCUMENTS 11,027,679 B2 *    6/2021   Yuki .................... H05K 5/0204
11,938,789 B2 *    3/2024   Stoltz .................... B60K 17/22
(Continued)

FOREIGN PATENT DOCUMENTS

CN    2652701 Y    11/2004
CN    106608176 A    5/2017
(Continued)

OTHER PUBLICATIONS

PCT/EP2021/052401, International Search Report dated May 3, 2021 (Two (2) pages).
Chinese-language Office Action issued in Chinese Application No. 202180013031.9 dated Nov. 23, 2024 with partial English translation (15 pages).

*Primary Examiner* — James A Shriver, II
*Assistant Examiner* — Nicholas R. Kandas
(74) *Attorney, Agent, or Firm* — Crowell & Moring LLP

(57) ABSTRACT

A hybrid-electric powertrain includes an internal combustion engine, a transmission, and an electric machine, where the electric machine is connected to the transmission for transmitting torque. The transmission has a transmission housing, within which there is disposed an output-side gear set assembly, and also a transmission housing cover disposed on an output side of the transmission as seen in an axial direction. The electric machine has a stator, a rotor, a rotor shaft connected to the rotor for conjoint rotation, and an electric machine housing. In addition, the electric machine has a connection housing for connecting the electric machine to the transmission housing. The rotor shaft of
(Continued)

the electric machine is disposed parallel to a transmission input shaft of the transmission.

16 Claims, 4 Drawing Sheets

(51) Int. Cl.
  *B60K 6/48* (2007.10)
  *B60L 7/10* (2006.01)
  *F16H 57/02* (2012.01)
  *F16H 57/031* (2012.01)

(52) U.S. Cl.
  CPC .... *F16H 57/031* (2013.01); *B60K 2006/4825* (2013.01); *B60Y 2200/92* (2013.01); *F16H 2057/02034* (2013.01); *F16H 2057/02043* (2013.01)

(58) Field of Classification Search
  CPC .... B60K 6/20; B60K 6/36; B60L 7/10; F16H 57/031; F16H 2057/02034; F16H 2057/02043; B60Y 2200/92
  See application file for complete search history.

(56) References Cited

U.S. PATENT DOCUMENTS

| | | |
|---|---|---|
| 2015/0008057 A1* | 1/2015 | Lo ............................ B60L 7/10 |
| | | 180/65.23 |
| 2017/0182996 A1 | 6/2017 | Hose |
| 2019/0162272 A1 | 5/2019 | Eo et al. |
| 2019/0263246 A1 | 8/2019 | Hummel |
| 2019/0291563 A1* | 9/2019 | Ogino ................... B60K 6/365 |

FOREIGN PATENT DOCUMENTS

| | | | |
|---|---|---|---|
| CN | 109838511 A | 6/2019 | |
| CN | 109890638 A | 6/2019 | |
| CN | 110072722 A | 7/2019 | |
| DE | 28 05 594 A1 | 8/1979 | |
| DE | 102011109025 A1 * | 4/2012 | ............... B60K 6/48 |
| DE | 10 2013 201 744 A1 | 8/2014 | |
| DE | 10 2014 018 947 A1 | 7/2015 | |
| DE | 10 2018 203 207 A1 | 9/2019 | |
| WO | WO 2018/085406 A1 | 5/2018 | |

* cited by examiner

HYBRID-ELECTRIC POWERTRAIN AND LORRY EQUIPPED WITH SAME

BACKGROUND AND SUMMARY OF THE INVENTION

The invention relates to a hybrid-electric powertrain and to a lorry having such a hybrid-electric powertrain.

DE 10 2011 109 025 describes a hybrid-electric powertrain for a lorry. In that case, an electric machine is arranged coaxially to a transmission input shaft. On one side of a longitudinal member of a carrier frame of the lorry, a radiator, power electronics and a battery are individually arranged at large distances from each other in an axial direction. Seen in the axial direction, the radiator is level with the electric machine, followed in the axial direction by the power electronics and at a greater distance by the battery. A hybrid-electric powertrain similar in principle is known from US 2015/0008057 A1.

Documents DE 102013201744 A1 and DE 102018203207 A1 describe hybrid-electric powertrains in which a rotor shaft of an electric machine is arranged parallel to a transmission input shaft.

Furthermore, a side module with a high-voltage battery is known from DE 102011109025 A1.

The object of the present invention is to improve a hybrid-electric powertrain in order to reduce manufacturing costs and improve compactness without negatively affecting performance characteristics.

The invention is based on a hybrid-electric powertrain which comprises an internal combustion engine, a transmission and an electric machine, wherein the electric machine is connected to the transmission for transmitting a torque. The transmission has a transmission housing, within which there are arranged at least an input-side transmission input shaft, a main shaft, and an output-side gear set assembly. Furthermore, as seen in an axial direction, a transmission housing cover is arranged on an output side of the transmission. The electric machine has a stator, a rotor, a rotor shaft connected to the rotor for conjoint rotation, and an electric machine housing. A transmission shaft is provided coaxially to the rotor shaft and is coupled or couplable to the rotor shaft, and in turn is coupled or couplable for conjoint rotation to an output gear arranged coaxially to the transmission shaft. The output gear is configured here to transmit torque from the electric machine to the transmission. In addition, the electric machine has a connection housing for fastening the electric machine to the transmission housing. The rotor shaft of the electric machine is arranged here parallel to the transmission input shaft of the transmission. Furthermore, seen in the axial direction, the transmission input shaft, the main shaft, and the electric machine are arranged one after the other in the order stated here, wherein, as mentioned, the rotor shaft of the electric machine is arranged parallel and offset to the transmission input shaft and the main shaft.

In accordance with the invention, the transmission input shaft is formed separately from the main shaft and is basically rotatable with respect to the main shaft, wherein the output gear is arranged in an axial region of the transmission input shaft or in an axial region of an input side of the main shaft.

This allows the hybrid-electric powertrain to be realized in a cost-effective and compact way on the whole. The hybrid-electric powertrain can thus be implemented cost-effectively both as a new concept and as a retrofit solution for a conventional transmission, in particular for a conventional commercial vehicle transmission. At first glance, an arrangement of the electric machine far away from the output gear may seem impractical and expensive. However, taking into account many aspects, such as the boundary conditions for installation in a vehicle, the conversion costs in the event of a retrofitting of a conventional transmission, and the configuration of transmission ratios with regard to fuel economy and performance, it has been found that the invention achieves an optimum within the various criteria to be considered. Due to the connection of the output gear and thus ultimately the connection of the electric machine in an input-side region of the transmission, it is possible to use many gears of the transmission with an electric drive by means of the electric machine, which allows the electric machine to be made smaller and drive energy to be saved.

The axial direction is defined here as the direction of a rotation axis of the transmission input shaft.

A coaxial arrangement of two rotatably mounted components shall always be understood to mean that the axes of rotation of the two components are arranged coaxially to each other.

The output side of the transmission is the side of the transmission on which torques are transmitted from the transmission via a transmission output shaft in the direction of vehicle drive wheels, for example of a lorry. The output side is located at the end of the transmission opposite the transmission input shaft.

An input side of the main shaft is understood to mean an input-side end region of the main shaft. In other words, it is understood to mean an end region of the main shaft facing the transmission input shaft.

The axial region is generally understood to be a space defined by a coordinate interval on an axis running parallel to the axial direction, wherein coordinates of the two other spatial directions can be arbitrary.

Assuming a three-dimensional coordinate system with axes x, y and z perpendicular to each other, wherein the x-axis is coaxial to the rotation axis of the transmission input shaft, the "axial region of the transmission input shaft or the axial region of the input side of the main shaft" means a space, defined on the x-axis by an interval extending from an input side of the transmission input shaft to an output-side end of a first input-side quarter of the main shaft, wherein any values on the y-axis and on the z-axis are possible. In other words, the axial region of the input side of the main shaft also means a length region of the main shaft facing the transmission input shaft, the length of which corresponds to a quarter of a total length of the main shaft.

The fact that elements are arranged one after the other as seen in the axial direction shall be understood to mean that the elements are not, or only insignificantly arranged in axially overlapping fashion. This means that the elements mentioned are arranged substantially in different coordinate intervals of the x-axis.

In the context of the present invention, a connection for conjoint rotation of two rotatably mounted elements means that the two elements are arranged coaxially to each other and are connected to each other in such a way that they rotate at the same angular velocity. In the case of the connection for conjoint rotation of the rotor and rotor shaft, which are each rotatably mounted, the rotor shaft is arranged coaxially to the rotation axis of the rotor and is connected to the rotor in such a way that the rotor and rotor shaft rotate at the same angular speed.

The parallel arrangement of the rotor shaft of the electric machine to the transmission input shaft is to be understood as a departure from a coaxial arrangement, but not in the sense of an arrangement at the same axial height. The parallel arrangement shall be understood to mean that a rotation axis of the rotor shaft is arranged parallel to the rotation axis of the transmission input shaft.

"Coupled" here means a direct or indirect torque-transmitting connection of the transmission shaft to the rotor shaft. "Couplable" includes alternately the possibility of a coupled and a separate, i.e., non-torque-transmitting state. The torque-transmitting connection of the output gear to the transmission means, for example, a spur gear connection to a gearwheel of the transmission.

According to a first advantageous development of the invention, the connection housing is formed in one part with the transmission housing cover to form a combination housing, wherein the output gear is arranged outside the combination housing.

Here, too, a connection housing that is embodied in one part with the transmission housing cover to form a combination housing, but within which the output gear cannot be arranged, looks disadvantageous at first glance. The combination housing has, particularly advantageously, a sealed shaft bushing for the transmission shaft, since the output gear is arranged outside the combination housing and thus the transmission shaft is also arranged at least partially outside the combination housing. However, the constructional effort is worthwhile, since with the elaborately designed combination housing, a conventional transmission can be used without modification or with only minor modifications to the transmission housing.

The one-part configuration of the transmission housing cover and the connection housing means that the transmission housing cover and the connection housing are either made of a casting or are at least connected in an integrally bonded manner. The combination housing is particularly advantageously embodied as a one-part cast metal component.

According to an advantageous development of the invention, the combination housing is arranged between the output-side gear set assembly and the electric machine, seen in the axial direction. Seen in the axial direction, the output-side gear set assembly means the last gear set assembly on the output side, with the aid of which a gear ratio can be generated between the main shaft and the transmission output shaft. Advantageously, the output-side gear set assembly has a planetary gearing set.

This enables a compact and cost-effective realization of the hybrid-electric powertrain through a compact embodiment of the combination housing.

A further advantageous development of the invention provides that the combination housing comprises a first opening and a second opening, wherein a first opening direction of the first opening is arranged oppositely to a second opening direction of the second opening, wherein the electric machine is arranged on a side of the second opening facing away from the transmission input shaft, as seen in the axial direction.

This makes it possible to position the electric machine advantageously relative to the transmission due to its dimensions and to connect it to the transmission cost-effectively. Although this lengthens the hybrid-electric powertrain, it results in an advantageous embodiment of the combination housing and an overall packaging.

The first opening direction refers here to the first opening of the combination housing towards the transmission, and the second opening direction of the combination housing refers to the second opening towards the electric machine. The first and the second openings are directed oppositely to each other in their respective opening directions as seen in the axial direction. Advantageously, the first opening is formed by a first flange half and the second opening is formed by a second flange half.

A further advantageous development of the invention provides that the output gear is connected to the transmission input shaft in such a way that torques, starting from the output gear, can be introduced into the transmission via the transmission input shaft. In this context, "connected" means that the output gear is coupled or couplable to the transmission input shaft.

Such a connection makes it possible to design the torque transmission of the electric machine to the vehicle drive wheels, for example of a lorry, with different gear ratios and thus ensure high performance.

Advantageously, the output gear is connected to a splitter group of the transmission. Here, the term "splitter group" refers to a transmission group, known per se axially on the input side, of the transmission which, in the case of this development, is formed as a group transmission. The introduction of torques starting from the output gear via the splitter group into the transmission can be implemented advantageously via a direct or indirect torque-transmitting connection of the output gear to a gearwheel of the splitter group.

According to a further advantageous development of the invention, the hybrid-electric powertrain comprises a transmission stage arranged between the rotor shaft and the transmission with respect to a torque flow, wherein the transmission stage is arranged at least partially within the combination housing.

This allows the use of a cost-effective and compact electric machine, the characteristics of which in respect of its speeds and torques must, however, be adapted to those of the internal combustion engine in the powertrain.

In this context, the transmission stage can be understood to mean any suitable means for converting rotational movements of a first element into rotational movements of a second element, wherein the rotational speeds and torques of the first element and the second element are each in a specific ratio to one another.

A further advantageous development of the invention provides that the transmission stage has a planetary gearing arranged coaxially to the rotor shaft, wherein a first element of the planetary gearing is connected to the rotor shaft for conjoint rotation, and wherein a second element of the planetary gearing is connected to the transmission in such a way that torques, starting from the second element of the planetary gearing, can be introduced into the transmission. Advantageously, a third element of the planetary gearing is arranged fixed to the housing.

The planetary transmission is a space-saving way of converting the speeds and torques of the electric machine, each in a specific ratio.

The planetary gearing has three elements here, specifically a sun gear, a planet carrier and a ring gear. The first element of the planetary gearing is particularly advantageously the sun gear, the second element, depending on this, is particularly advantageously the planet carrier, and the third element is the ring gear, wherein the ring gear is advantageously connected to a non-rotatably mounted element, for example the combination housing.

According to a further advantageous development of the invention, the output gear, a main group, and, if applicable, a range-change group of the transmission, the transmission stage, and the electric machine are arranged one after the other in the stated order, seen in the axial direction.

This arrangement achieves a high degree of compactness of the entire hybrid-electric powertrain with a favourable gear ratio at the same time.

A further advantageous development of the invention provides that the hybrid-electric powertrain has a first shift unit which is configured to couple the rotor shaft to the transmission in a torque-transmitting manner in such a way that torque can be introduced from the electric machine into the transmission in the axial region of the input side of the transmission. In addition, the hybrid-electric powertrain has a second shift unit which is configured to couple the rotor shaft to the transmission in a torque-transmitting manner in such a way that torque can be transmitted from the transmission to the electric machine in the axial region of the output side of the transmission.

This means that, on the one hand, torque transmission from the electric machine to the drive wheels, for example of a lorry, via the transmission, for example when introducing torque via the splitter group into the transmission, can be implemented with different gear ratios and thus a high performance can be achieved in forward propulsion. On the other hand, torque transmission from the transmission to the electric machine, for example directly from the transmission output shaft for the purpose of recuperation, can be implemented with low losses and a suitable transmission ratio.

In this context, a shift unit is understood to be any means that is suitable for establishing and also interrupting a rotationally conjoint or torque-transmitting connection between two rotatably mounted elements. Torque is transmitted from the transmission to the electric machine, for example in the case of recuperation. In this case, the electric machine is operated as a generator.

According to a further advantageous development of the invention, the first shift unit and the second shift unit are configured in the form of a dual shift unit, which is arranged axially in the region of the output side of the transmission.

This reduces the complexity of the gearbox and makes it more compact overall.

A first and a second coupling state can be realized with the dual shift unit. The first coupling state is defined here as the introduction of torque from the electric machine into the transmission in the axial region of the input side, and the second coupling state is defined as the transmission of torque from the transmission to the electric machine in the axial region of the output side of the transmission.

A dual shift unit can be understood to mean a shift unit that makes it possible to establish both coupling states alternately with only one actuator. In addition, the dual shift unit can also be configured to be able to establish a neutral state.

A further advantageous development of the invention provides that the hybrid-electric powertrain comprises a side module, wherein the side module comprises a battery, a battery control unit, power electronics, a compressor, and a radiator of the hybrid-electric powertrain.

Components of the side module, namely battery, battery control unit, power electronics, compressor, and radiator, for electrical operation of the hybrid-electric powertrain can thus be arranged in a particularly compact manner.

The aforementioned components of the side module, together with the electric machine, form an electric part of the powertrain.

According to a further advantageous development of the invention, the battery is arranged in a first horizontal plane of the side module and the radiator, the compressor, the power electronics, and the battery control unit are arranged one after the other in a second horizontal plane of the side module, seen in the axial direction, in the stated order.

This achieves a compact arrangement of components of the electric part of the powertrain with short electrical cables and short cooling lines while maintaining modularity.

The first horizontal plane advantageously lies vertically below the second horizontal plane. Advantageously, the power electronics are arranged at the axial level of the electric machine as seen in the axial direction. The first horizontal plane thus also corresponds to a first vertical region, and the second horizontal plane to a second vertical region. If the axial order of the stated components is observed, intermediate components not mentioned are unproblematic.

In addition to a carrier frame, a lorry according to the invention comprises the previously described hybrid-electric powertrain according to the invention. The side module is arranged here in or on a side frame, wherein the side frame itself is arranged on an outer side of the carrier frame.

The components for operating the hybrid-electric powertrain can thus be arranged in a particularly compact manner and at the same time be accommodated separately in modular form in a lorry.

An outer side of the carrier frame can be understood here to mean an outwardly pointing side of a longitudinal member of the carrier frame, i.e., a side facing away from the transmission. The side frame is attached here advantageously to the carrier frame, wherein this does not have to be done on the described outer side. Rather, the attachment can also be made on the upper or lower side of the carrier frame.

Further advantages, features and details of the invention will become apparent from the following description of exemplary embodiments and with reference to the figures.

DETAILED DESCRIPTION OF THE DRAWINGS

Figure 1:
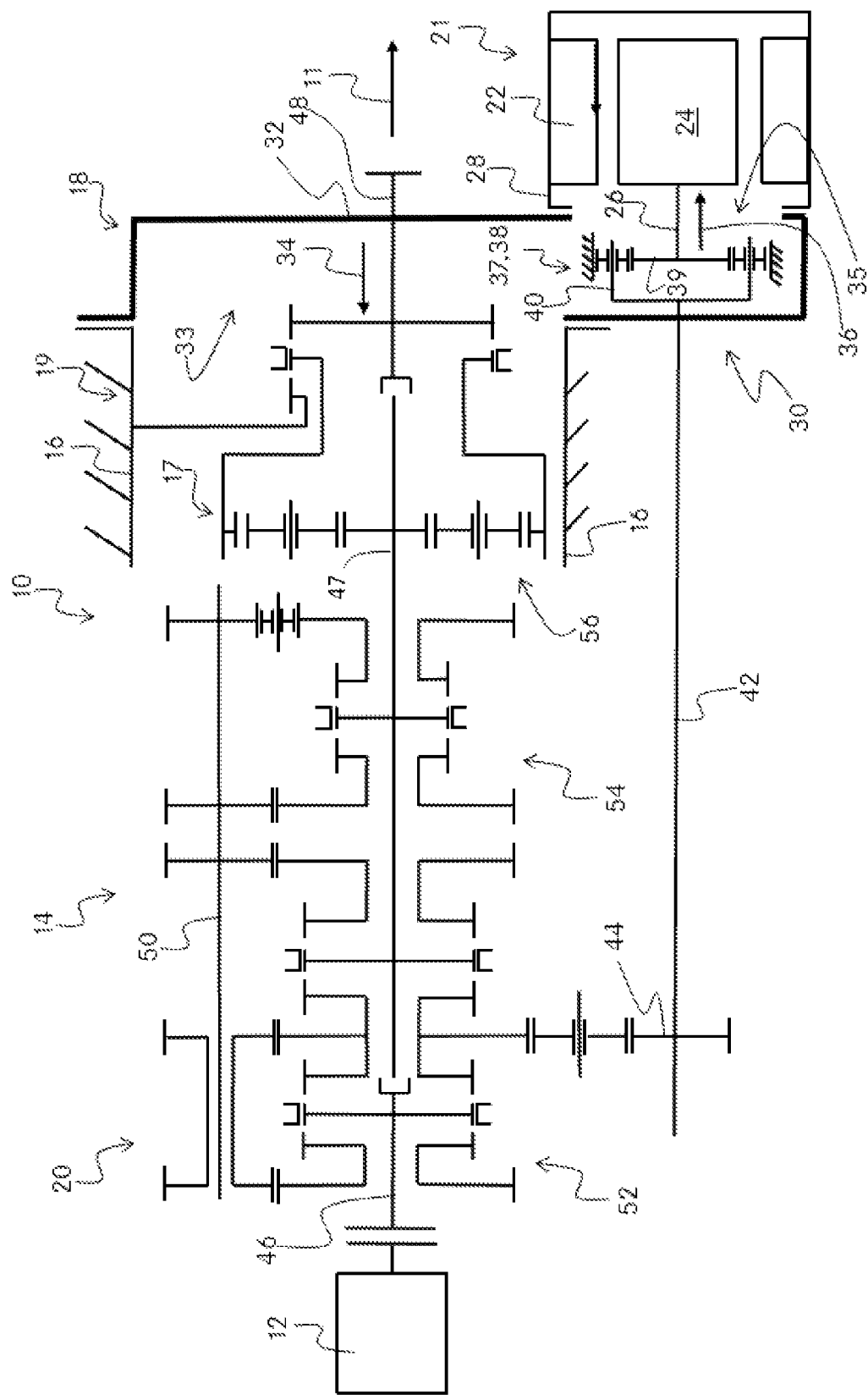
FIG. 1 shows a schematic depiction of a hybrid-electric powertrain according to the invention in a first embodiment.

FIG. 1 shows a schematic depiction of a hybrid-electric powertrain 10 according to the invention in a first embodiment. The hybrid-electric powertrain 10 comprises an internal combustion engine 12, a transmission 14 and an electric machine 21. The transmission 14 has a transmission housing 16, within which there is arranged at least one output-side gear set assembly 17 of the transmission 14.

The electric machine 21 has a stator 22, a rotor 24 and a rotor shaft 26 that is connected to the rotor 24 for conjoint rotation. The stator 22 and the rotor 24 are arranged in an electric machine housing 28. Furthermore, a connection housing 30 is provided, which serves to connect the electric machine 21, more precisely the electric machine housing 28, to the transmission housing 16. The connection housing 30 serves to connect the transmission housing 16 to the electric machine housing 28 for conjoint rotation and in an axially fixed manner. The electric machine housing 28 is connected to the connection housing 30 for conjoint rotation and in an axially fixed manner. The electric machine housing 28 is directly connected to the connection housing 30. The connection housing 30 is connected to the transmission housing 16 in an axially fixed manner and for conjoint rotation.

The electric machine 21 is furthermore also connected to the transmission 14 for the transmission of torque. For this purpose, the rotor shaft 26 in the present example is coupled to a transmission shaft 42 in a torque-transmitting manner. An output gear 44 is connected to the transmission shaft 42 for conjoint rotation and is connected in a torque-transmitting manner to the transmission 14, in this example to a splitter group 52, in an axial region of an input side 20 of the transmission 14. In this way, torque can be introduced into the transmission 14 from the output gear 44 via the splitter group 52.

Alternatively, the output gear 44 may be arranged coaxially to the transmission shaft 42 as a shiftable idler gear in a manner not shown here. Generally, the output gear 44 is coupled or couplable to the transmission shaft 42 for conjoint rotation.

The internal combustion engine 12 is connected to the transmission 14 in such a way that torque, starting from the internal combustion engine 12, can be introduced into the transmission 14 via a transmission input shaft 46 of the transmission 14.

In the first exemplary embodiment, the transmission 14 further comprises, in a manner known per se, a main shaft 47 arranged coaxially to the transmission input shaft 46, a countershaft 50, the splitter group 52, a main shift assembly 54 and a range-change group 56.

Torque can be transmitted from the transmission 14 in a known manner, for example to an axle drive, via a transmission output shaft 48 of the transmission 14.

The electric machine 21 is particularly advantageously arranged in the vicinity of an output side 19 of the transmission 14. The rotor shaft 26 of the electric machine 21 is arranged parallel to the transmission input shaft 46 of the transmission 14. Seen in an axial direction 11, the transmission housing 16 has a transmission housing cover 18 on the output side 19. Particularly advantageously, the transmission housing cover 18 is formed in one part with the connection housing 30 of the electric machine 21 to form a combination housing 32.

The axial direction 11 is arranged here parallel to the transmission input shaft 46.

The transmission output shaft 48 is arranged coaxially to the transmission input shaft 46.

The combination housing 32 has a first opening 33 which, in the assembled state of the hybrid-electric powertrain 10, is closed or covered by the transmission housing 16. The combination housing 32 comprises at least this first opening 33.

The combination housing 32 advantageously comprises a second opening 35, which is closed or covered by the electric machine housing 28 in the assembled state of the hybrid-electric powertrain 10. The second opening 35 is particularly advantageous if further components arranged coaxially to the rotor 24 are to be arranged in the combination housing 32.

If no further components of the electric machine 21 arranged coaxially to the rotor shaft 26 are to be arranged in the combination housing 32, the second opening can be omitted, which means that the combination housing 32 can only form a plate in an axial region of the rotor shaft, with the electric machine housing 28 being fastened to the plate in this case.

Particularly advantageously, a first opening direction 34 of the first opening 33 is directed towards the transmission 14, wherein a second opening direction 36 of the second opening 35 is directed oppositely to the first opening direction 34. The second opening direction 36 is directed towards the electric machine 21.

Advantageously, the electric machine housing 28 is formed separately from the combination housing 32 and also separately from the transmission housing 16.

Seen in the axial direction 11, the internal combustion engine 12, the output gear 44, the output-side gear set assembly 17, the combination housing 32 and the electric machine 21 are advantageously arranged one after the other in the stated order.

As further components arranged coaxially to the rotor 24, the hybrid-electric powertrain 10 in the first exemplary embodiment comprises components of a transmission stage 37. The transmission stage 37 comprises a planetary gearing 38, which in turn comprises a first element 39 connected to the rotor shaft 26 for conjoint rotation, and a second element 40 connected to the transmission shaft 42 for conjoint rotation. In the exemplary embodiments, the first element 39 is formed as a sun gear and the second element 40 is formed as a planet carrier. Not specified in greater detail, the planetary gearing 38 comprises a third element in the form of a ring gear, which is connected to the combination housing 32 for conjoint rotation.

The transmission stage 37 does not necessarily have to be used. Alternatively, the rotor shaft 26 can be directly connected to the transmission shaft 42 for conjoint rotation or can be coupled thereto for conjoint rotation via a shift element (not shown).

Figure 2:
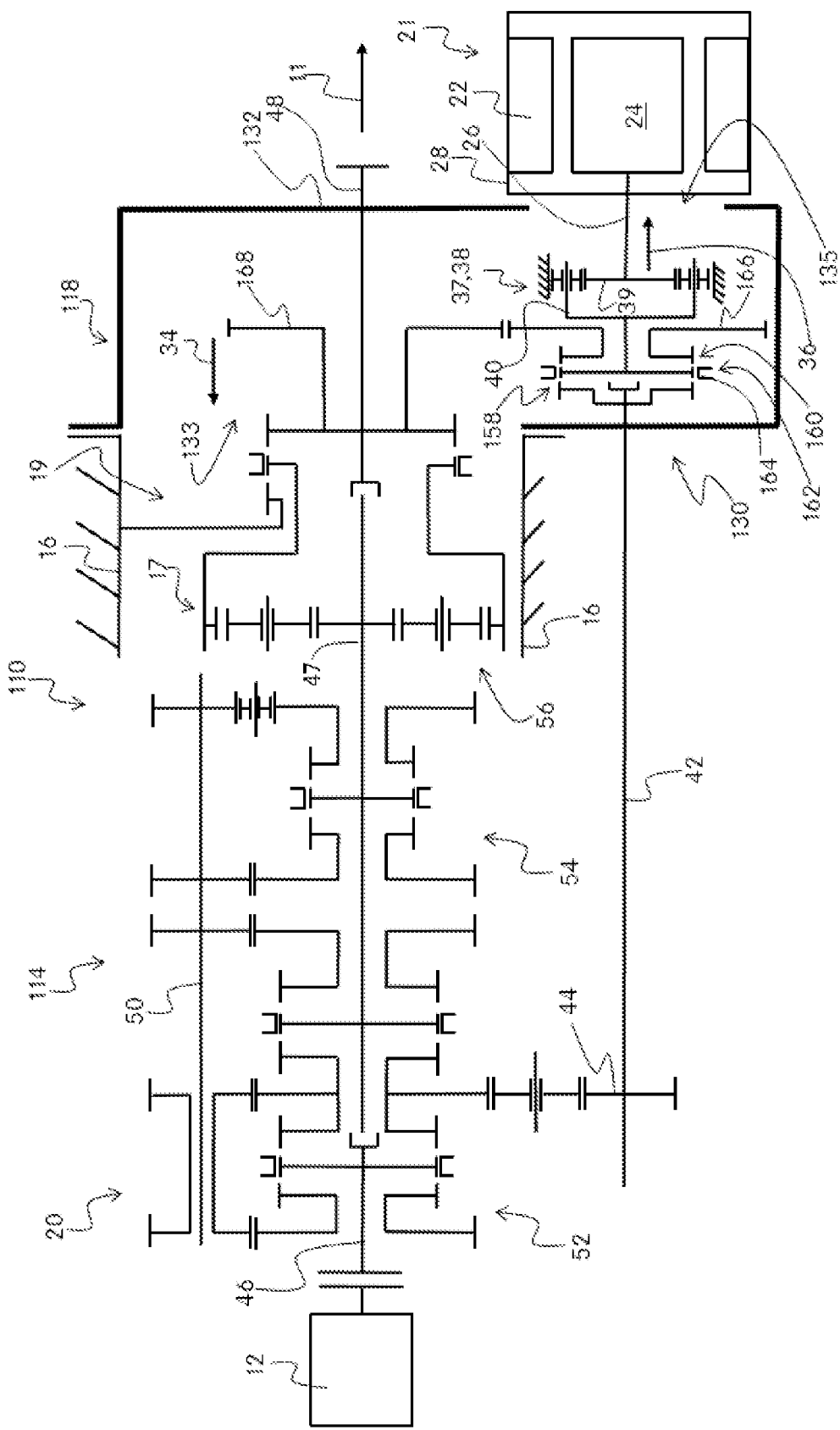
FIG. 2 shows a schematic depiction of a hybrid-electric powertrain according to the invention in a second embodiment.

FIG. 2 shows a schematic depiction of a hybrid-electric powertrain 110 according to the invention in a second embodiment. The hybrid-electric powertrain 110 of the second embodiment differs from that of the first embodiment substantially in that two shift units 158, 160, namely a first shift unit 158 and a second shift unit 160, are connected downstream of the transmission stage 37, which in itself remains the same.

By means of the first shift unit 158, the rotor shaft 22 can be coupled to the splitter group 52 in such a way that torque starting from the rotor shaft 22 can be introduced into a transmission 114 via the splitter group 52. In the second exemplary embodiment, the first shift unit 158 is provided for connecting the second element 40 of the transmission stage 37 to a transmission shaft 142 for conjoint rotation. By means of the first shift unit 158, the rotor shaft can thus be coupled to the transmission output shaft 48 in such a way that the torque delivered from the rotor shaft 26 can be transmitted to the transmission output shaft 48 via many gear stages adjustable by means of the transmission 114, which is advantageous for the purpose of an electromotive drive of the transmission output shaft 48.

By means of the second shift unit 160, the rotor shaft 26 on the output side 19 can be connected to the output shaft 48 of the transmission 114. The connection of the rotor shaft 26 on the output side 19 of the transmission 114 means that only one or a few gear stages are provided between the rotor shaft 26 and the output shaft 48, but that therefore only a few gear meshes are provided between the rotor shaft 26 and the output shaft 48. The connection of the rotor shaft 26 to the output shaft 48 via the second shift unit 160 is particularly suitable for a torque flow starting from the output shaft 48 to the rotor shaft 26 and thus for regenerative operation of the electric machine 21, which can thus be implemented with particularly low losses.

By means of the second shift unit 160, in the second exemplary embodiment, an idler gear 166 arranged coaxially to the rotor shaft 26 can be connected to the second element 40 for conjoint rotation. The idler gear 166 in turn permanently meshes with a fixed gear 168 that is connected to the transmission output shaft 48 for conjoint rotation.

Advantageously, the first shift unit 158 and the second shift unit 160 are combined to form a dual shift unit 162 in such a way that they can be switched with a single sliding sleeve 164 and thus with a single actuator, which is not shown further.

The transmission 114 of the second embodiment thus differs from that of the first embodiment merely in that the fixed gear 168 is provided and in that, as a consequence, a transmission housing cover 118 of the transmission 114 and thus a combination housing 132 must be shaped differently in detail.

The combination housing 132 of the second embodiment is also therefore modified from the first embodiment because a connection housing 130 of the second embodiment must be more spacious to accommodate the two shift units 158, 160.

The combination housing 132 also has a first opening 133 and a second opening 136, wherein, here too, the basic conditions described above for the first embodiment with regard to the openings 32, 33 are applicable.

Those features that remain unchanged in the second embodiment compared to the first embodiment are marked with unchanged reference signs in FIG. 2.

Figure 3:
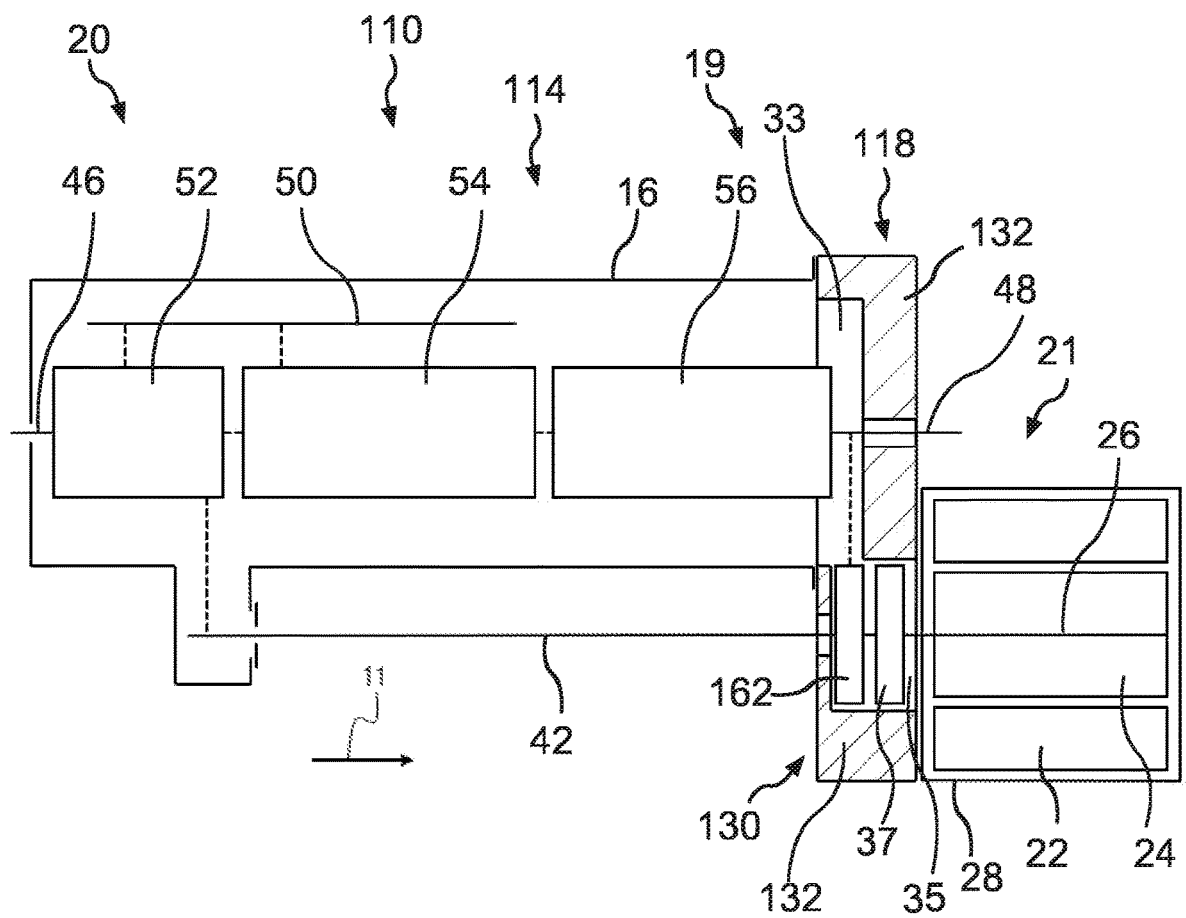
FIG. 3 shows a further schematic depiction of the hybrid-electric powertrain in the second embodiment.

FIG. 3 shows a further schematic depiction of the hybrid-electric powertrain 110 in the second embodiment. The transmission input shaft 46, the countershaft 50, the splitter group 52, the main shift group 54, the range-change group 56 and the transmission output shaft 48 are arranged in the transmission housing 16. Torque-transmitting or shiftable torque-transmitting connections of the transmission elements to each other or to other elements are partially indicated by dashed lines. The electric machine 21 with the stator 22, the rotor 24, and the rotor shaft 26 connected to the rotor 24 for conjoint rotation is located in the electric machine housing 28.

The rotor shaft 26 of the electric machine 21 is arranged parallel to the transmission input shaft 46 of the transmission 114. Seen in the axial direction 11, the transmission housing 16 has, on the output side 19 of the transmission 114, the transmission housing cover 118, which is formed in one part with the connection housing 130 to form the combination housing 132.

The combination housing 132, shown hatched, comprises the first opening 33 facing the transmission 114 and, opposite thereto, the second opening 35 facing the electric machine 21.

The first opening 33 and the second opening 35 are, in principle, the same as in the first embodiment. The openings 33, 35 are advantageously delimited by flange surfaces, not shown further, wherein a first flange surface delimits the first opening 33 and a second flange surface delimits the second opening 35. The first flange surface is screwed to the transmission housing 16 in a known manner, and the second flange surface is advantageously screwed to the electric machine housing 28.

Inside the combination housing 132 there are located the dual shift unit 162 and the transmission stage 37.

As in the first embodiment, the combination housing 132 is arranged axially between a planetary gear set of the range-change assembly 56 and the electric machine 21.

Figure 4:
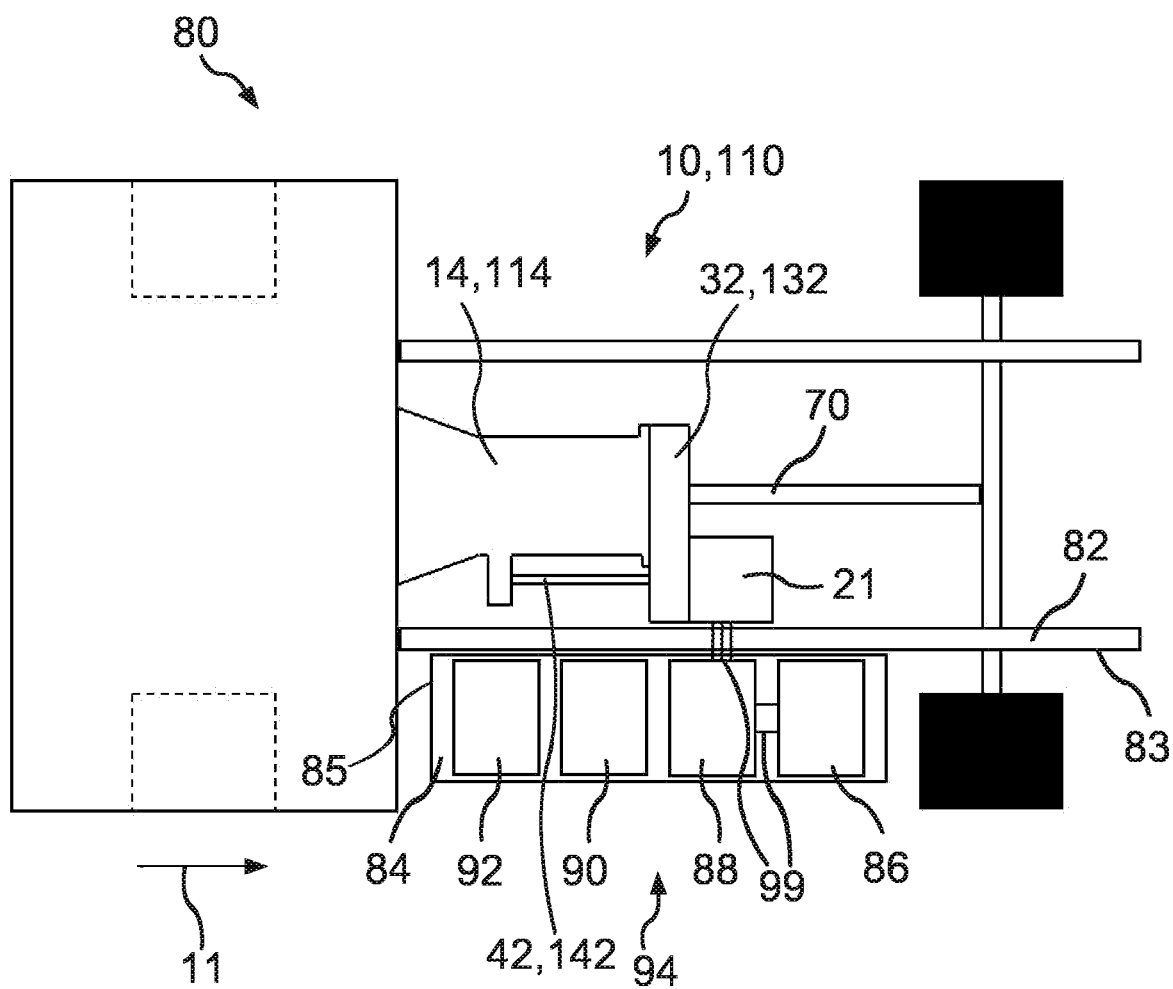
FIG. 4 shows a schematic depiction of a lorry according to the invention.

FIG. 4 shows a schematic depiction of a lorry 80 according to the invention with the powertrain 10, 110 according to the invention in the first or the second embodiment. The transmission 14, 114, the combination housing 32, 132, the electric machine 21, the transmission shaft 42, 142, and a cardan shaft 70 are arranged between longitudinal members of a carrier frame 82. The cardan shaft 70 is connected to a rear axle of the lorry 80 in a torque-transmitting manner known to the person skilled in the art and therefore not shown in further detail.

There is arranged, on an outer side 83 of the carrier frame 82, a side frame 85, in or on which there is arranged a side module 94. The side module 94 has a battery 84, a battery control unit 86, power electronics 88, a compressor 90, and a radiator 92.

The battery 84 is located in a first, lower level and thus close to the roadway, while the battery control unit 86, the power electronics 88, the compressor 90 and the radiator 92 are located in an upper, second level, horizontally seen above the battery 84.

Seen in the axial direction 11, the radiator 92, the compressor 90, the power electronics 88, and the battery control unit 86 are advantageously arranged one after the other in the stated order. This arrangement is advantageous for several reasons. Firstly, the arrangement of the electric machine 21 on the output side of the transmission 14, 114 is advantageous for reasons of space, although disadvantageous to a certain extent due to the long transmission shaft 42, 142. The arrangement of the components belonging to the side module 94 on the carrier frame 82 makes it possible to create the hybrid-electric powertrain 10, 110 from a conventional powertrain with relatively little effort. In addition, due to the modular design, the hybrid-electric powertrain 10, 110 can also be dismantled from the conventional powertrain with relatively little effort.

The power electronics 88 are advantageously arranged approximately at the axial level of the electric machine 21 as seen in the axial direction 11. The battery control unit 86, the power electronics 88, and the electric machine 121 are connected to each other by means of lines 99. For reasons of electromagnetic compatibility, it is advantageous to arrange these components close to each other.

The arrangement of the radiator 92 at the foremost point of the side module 94, as seen in the direction of travel of the lorry 80, advantageously allows a sufficient flow of air against the radiator 92 by the headwind, and thus sufficient cooling.

The advantageous arrangement of the components of the side module 94 thus results from a variety of aspects of packaging, electromagnetic compatibility, cooling and convertibility starting from a conventional powertrain.

LIST OF REFERENCE CHARACTERS 10, 110 hybrid-electric powertrain
11 axial direction
12 internal combustion engine
14, 114 transmission
16 transmission housing
17, 117 output-side gear set assembly
18, 118 transmission housing cover
19 output side
20 input side
21 electric machine
22 stator
24 rotor
26 rotor shaft 28 electric machine housing
30, 130 connection housing
32, 132 combination housing
33 first opening
34 first opening direction
35 second opening
36 second opening direction
37 transmission stage
38 planetary gearing
39 first element
40 second element
42, 142 transmission shaft
44 output gear
46 transmission input shaft
47 main shaft
48 transmission output shaft
50 countershaft
52 splitter group
54 main group
56 range-change group
158 first shift unit
160 second shift unit
162 dual shift unit
164 sliding sleeve
166 idler gear
168 fixed gear
70 cardan shaft
80 lorry
82 carrier frame
83 outer side
84 battery
85 side frame
86 battery control unit
88 power electronics
90 compressor
92 radiator
94 side module
99 lines

The invention claimed is:

1. A hybrid-electric powertrain (10), comprising:
an internal combustion engine (12);
a transmission (14) with a transmission housing (16), wherein within the transmission housing (16) is disposed an input-side transmission input shaft (46), a main shaft (47), and an output-side gear set assembly (17);
a transmission housing cover (18) disposed on an output side (19) of the transmission (14) as seen in an axial direction (11);
an electric machine (21) with a stator (22), a rotor (24), and a rotor shaft (26) connected to the rotor (24) for conjoint rotation, wherein the electric machine (21) is connected to the transmission (14) for transmitting a torque from the electric machine (21) to drive wheels via the transmission (14); and
a transmission shaft (42) disposed coaxially to the rotor shaft (26) and coupled or couplable to the rotor shaft (26) with an output gear (44) which is disposed coaxially to the transmission shaft (42), wherein the output gear (44) is configured to transmit the torque from the electric machine (21) into the transmission (14);
wherein the electric machine (21) has a connection housing (30) for connecting the electric machine (21) to the transmission housing (16) and is connected to the transmission (14) for transmitting the torque into the transmission (14);
wherein the rotor shaft (26) of the electric machine (21) is disposed parallel to the transmission input shaft (46) and wherein, seen in the axial direction (11), the transmission input shaft (46), the main shaft (47), and the electric machine (21) are disposed in the claimed order one after the other;
wherein the transmission input shaft (46) is formed separately from the main shaft (47) and is basically rotatable with respect to the main shaft (47) and wherein the output gear (44) is disposed in an axial region of the transmission input shaft (46) or in an axial region of an input side of the main shaft (47).

2. The hybrid-electric powertrain (10) according to claim 1, wherein the connection housing (30) is formed in one part with the transmission housing cover (18) to form a combination housing (32) and wherein the output gear (44) is disposed outside the combination housing (32).

3. The hybrid-electric powertrain (10) according to claim 2, wherein the combination housing (32) is disposed between the output-side gear set assembly (17) and the electric machine (21) as seen in the axial direction (11).

4. The hybrid-electric powertrain (10) according to claim 2, wherein the output gear (44), a main group (54) of the transmission (14), the combination housing (32), and the electric machine (21) are disposed in the claimed order one after the other as seen in the axial direction (11).

5. The hybrid-electric powertrain (10) according to claim 2, wherein the combination housing (32) comprises a first opening (33) and a second opening (35), wherein a first opening direction (34) of the first opening (33) is disposed oppositely to a second opening direction (36) of the second opening (35), and wherein the electric machine (21) is disposed on a side of the second opening (35) facing away from the transmission input shaft (46) as seen in the axial direction (11).

6. The hybrid-electric powertrain (10) according to claim 1, wherein the output gear (44) is connected to the input shaft (46) of the transmission (14) such that the torque, starting from the output gear (44), is introducible into the transmission (14) via the input shaft (46).

7. The hybrid-electric powertrain (10) according to claim 2, further comprising a transmission stage (37) which is disposed in a torque flow between the rotor shaft (26) and the transmission (14), wherein the transmission stage (37) is disposed at least partially within the combination housing (32).

8. The hybrid-electric powertrain (10) according to claim 7, wherein the transmission stage (37) has a planetary gearing (38) disposed coaxially to the rotor shaft (26), wherein a first element (39) of the planetary gearing (38) is connected to the rotor shaft (26) for conjoint rotation, and wherein a second element (40) of the planetary gearing (38) is connected or connectable to the transmission (14) such that the torque, starting from the second element (40) of the planetary gearing (38), is introducible into the transmission (14).

9. The hybrid-electric powertrain (10) according to claim 7, wherein the output gear (44), a main group (54) of the transmission (14), the transmission stage (37), and the electric machine (21) are disposed in the claimed order one after the other as seen in the axial direction (11).

10. The hybrid-electric powertrain (10) according to claim 1, further comprising:
a first shift unit (158) which is configured to couple the rotor shaft (26) to the transmission (14) in a torque-transmitting manner such that the torque is introducible from the electric machine (21) into the transmission

(14) in the axial region of the transmission input shaft (46) or the axial region of the input side of the main shaft (47); and a second shift unit (160) which is configured to couple the rotor shaft (26) to the transmission (14) in a torque-transmitting manner such that the torque is transmittable from the transmission (14) to the electric machine (21) in an axial region of an output side (19) of the transmission (14).

11. The hybrid-electric powertrain (10) according to claim 10, wherein the first shift unit (158) and the second shift unit (160) are configured in a form of a dual shift unit (162) which is disposed axially in a region of the output side (19) of the transmission (14).

12. The hybrid-electric powertrain (10) according to claim 10, wherein the first shift unit (158) and the second shift unit (160) are disposed on a side of a transmission stage (37) facing away from the electric machine (21) as seen in the axial direction (11).

13. The hybrid-electric powertrain (10) according to claim 1, further comprising a side module (94), wherein the side module (94) comprises a battery (84), a battery control unit (86), power electronics (88), a compressor (90), and a radiator (92), wherein the battery (84) is disposed in a first horizontal plane (96) of the side module (94), and wherein the radiator (92), the compressor (90), the power electronics (88), and the battery control unit (86) are disposed axially in the claimed order in a second horizontal plane (98) of the side module (94).

14. A lorry (80), comprising:
a carrier frame (82); and
the hybrid-electric powertrain (10) according to claim 13;
wherein the side module (94) is disposed in or on a side frame (85) and wherein the side frame (85) is disposed on an outer side (63) of the carrier frame (82).

15. The hybrid-electric powertrain (10) according to claim 1, wherein the stator (22) and the rotor (24) of the electric machine (21) are disposed in an electric machine housing (28) of the electric machine (21) and wherein the connection housing (30) connects the electric machine housing (28) to the transmission housing (16) for conjoint rotation and in an axially fixed manner.

16. A hybrid-electric powertrain (10), comprising:
an internal combustion engine (12);
a transmission (14) with a transmission housing (16), wherein within the transmission housing (16) is disposed an input-side transmission input shaft (46), a main shaft (47), and an output-side gear set assembly (17);
a transmission housing cover (18) disposed on an output side (19) of the transmission (14) as seen in an axial direction (11);
an electric machine (21) with a stator (22), a rotor (24), and a rotor shaft (26) connected to the rotor (24) for conjoint rotation, wherein the electric machine (21) is connected to the transmission (14) for transmitting a torque from the electric machine (21) into the transmission (14);
a transmission shaft (42) disposed coaxially to the rotor shaft (26) and coupled or couplable to the rotor shaft (26) with an output gear (44) which is disposed coaxially to the transmission shaft (42), wherein the output gear (44) is configured to transmit the torque from the electric machine (21) into the transmission (14);
wherein the electric machine (21) has a connection housing (30) for connecting the electric machine (21) to the transmission housing (16) and is connected to the transmission (14) for transmitting the torque into the transmission (14);
wherein the rotor shaft (26) of the electric machine (21) is disposed parallel to the transmission input shaft (46) and wherein, seen in the axial direction (11), the transmission input shaft (46), the main shaft (47), and the electric machine (21) are disposed in the claimed order one after the other;
wherein the transmission input shaft (46) is formed separately from the main shaft (47) and is basically rotatable with respect to the main shaft (47) and wherein the output gear (44) is disposed in an axial region of the transmission input shaft (46) or in an axial region of an input side of the main shaft (47);
a first shift unit (158) which is configured to couple the rotor shaft (26) to the transmission (14) in a torque-transmitting manner such that the torque is introducible from the electric machine (21) into the transmission (14) in the axial region of the transmission input shaft (46) or the axial region of the input side of the main shaft (47); and
a second shift unit (160) which is configured to couple the rotor shaft (26) to the transmission (14) in a torque-transmitting manner such that the torque is transmittable from the transmission (14) to the electric machine (21) in an axial region of an output side (19) of the transmission (14);
wherein the first shift unit (158) and the second shift unit (160) are configured in a form of a dual shift unit (162) which is disposed axially in a region of the output side (19) of the transmission (14).

* * * * *